(12) United States Patent
Hwang et al.

(10) Patent No.: US 7,247,827 B1
(45) Date of Patent: Jul. 24, 2007

(54) SYSTEM FOR MEASUREMENT OF THE HEIGHT, ANGLE AND THEIR VARIATIONS OF THE SURFACE OF AN OBJECT

(75) Inventors: Ing-Shouh Hwang, Taipei (TW); En-Te Hu, Taipei (TW); Kuang-Yuh Huang, Taipei (TW)

(73) Assignee: Academia Sinica (TW)

( * ) Notice: Subject to any disclaimer, the term of this patent is extended or adjusted under 35 U.S.C. 154(b) by 0 days.

(21) Appl. No.: 11/443,027

(22) Filed: May 31, 2006

(51) Int. Cl.
*G02B 27/40* (2006.01)
*G11B 7/00* (2006.01)

(52) U.S. Cl. .............. 250/201.5; 250/221; 369/112.23; 369/44.23

(58) Field of Classification Search ............. 250/201.4, 250/201.5, 216, 221; 369/112.01, 112.23, 369/120, 121, 44.23
See application file for complete search history.

(56) References Cited

U.S. PATENT DOCUMENTS 7,130,258 B2 * 10/2006 Hendriks et al. ...... 369/112.01

* cited by examiner

*Primary Examiner*—Kevin Pyo
(74) *Attorney, Agent, or Firm*—Raymond J. Ho; Venable LLP (57) ABSTRACT

A system for measurement of the height, angle and their variations of the surface of an object comprises a measurement module and an astigmatic optical path mechanism. The optical path mechanism makes a laser beam pass a lens assembly and focus on an object. The reflected light passes the lens assembly and an astigmatic lens, arriving at the photo sensor assembly, forming a light spot thereon. The translational displacements of the object are measured by the variations in shape of the light spot on the photo sensors. The angular displacements of the object are measured accordingly by the movement of the light spot on the photo sensors.

13 Claims, 5 Drawing Sheets

(A)
$S_{FES}: (S_A+S_C)-(S_B+S_D)=0$
$S_Y: (S_A+S_D)-(S_B+S_C)>0$ (B)
$S_{FES}: (S_A+S_C)-(S_B+S_D)<0$
$S_Y: (S_A+S_D)-(S_B+S_C)>0$ (C)
$S_{FES}: (S_A+S_C)-(S_B+S_D)>0$
$S_Y: (S_A+S_D)-(S_B+S_C)>0$

SYSTEM FOR MEASUREMENT OF THE HEIGHT, ANGLE AND THEIR VARIATIONS OF THE SURFACE OF AN OBJECT

FIELD OF THE INVENTION

The present invention relates to a system for measurement of the height, angle and their variations of the surface of an object, especially to a system that is able to measure the translational and the angular displacements of the surface of the object at the same time. The present invention also discloses the method for measurement of the height and angle and their variations of the surface of the object using the invented system.

BACKGROUNDS OF THE INVENTION

The interferometer and the beam deflection method (or the optical lever method) are two most popular techniques for the non-contact and precise displacement measurement of objects. The interferometer measures the translational displacement of the object. It is, however, not useful in the measurement of the angular displacement of the object at the same time. The beam deflection method is useful in measuring the angular displacement of the object. An atomic force microscope (AFM) may use the beam deflection method to detect the angular displacement of its cantilever during the measurement of the object to be measured. The deformation of the cantilever will contain the information in the translational displacement and the information in the angular displacement of the cantilever. It is almost impossible to separate the information of the pure translational displacement and the information of the angular displacement from the information obtained from the deformation of the cantilever. The translational displacement of the cantilever may only be obtained indirectly based on certain geometric formulas relating to the bending cantilever. Therefore, the accuracy of the conventional AFM depends not only on the measurement system itself, but also by the accuracy of the calculation, which further depends on the physical and geometric characteristics of the cantilever. These characteristics vary depending on the material of the cantilevers being used. No universal data of these characteristics are available.

It is thus necessary to provide a system for measurement of the height, angle and their variations of the surface of an object that measures the translational displacement and the angular displacement of the cantilever of an atomic force microscope at the same time.

It is also necessary to provide a novel system for the precise measurement of the height, angle and their variations of the surface of an object.

It is also necessary to provide a system for measurement of the height, angle and their variations of the surface of an object that may be prepared in low costs.

It is also necessary to provide a system for measurement of the height, angle and their variations of the surface of an object that is easy to operate.

OBJECTIVES OF THE INVENTION

The objective of this invention is to provide a system for measurement of the height, angle and their variations of the surface of an object that measures the translational displacement and the angular displacement of the cantilever of an atomic force microscope at the same time.

Another objective of this invention is to provide a novel system for the precise measurement of the height, angle and their variations of the surface of an object.

Another objective of this invention is to provide a system for measurement of the height, angle and their variations of the surface of an object that may be prepared in low costs.

Another objective of this invention is to provide a system for measurement of the height, angle and their variations of the surface of an object that is easy to operate.

SUMMARY OF THE INVENTION

According to this invention, a system for measurement of the height, angle and their variations of the surface of an object is disclosed. The measurement system of this invention comprises a novel measurement module and an optical path mechanism using the astigmatism as its measurement configurations. The optical path mechanism is so designed that a laser beam passes through a lens assembly and focuses on the surface of the object to be measured and that the reflected light passes through said lens assembly and an astigmatic lens and projects onto a photo sensor assembly comprising a plurality of photo sensors, forming a light spot thereon. The translational displacement of the object in the height direction may be measured according to the variations in shape of the light spot on the photo sensors. The angular displacements of the object may be measured according to the movement of the light spot on the photo sensors. The focus error signals, the X-axis angular signals and the Y-axis angular signals are obtained from the signals of the photo sensors. These signals are used to represent the translational displacements and the angular displacements of the surface of the object to be measured, at the spot where the incident laser beam impinges. The non-contact and precise measurement of the height and angles and their variations of the surface of the object to be measured may thus be realized.

In the invented system for measurement of the height, angle and their variations of the surface of an object, the light source is not limited to laser beams. The lens used in the light path may be any lens. It is also possible to align the direction of the photo sensor assembly to a certain inclination to generate the astigmatic effects. The present invention may be used in the closed-loop control system for the translational and angular actuations or in precise measurement systems for the translational displacement, angular displacement or bending deformations of micro electromechanical systems. The focus error signal and the other signals obtained from the photo sensors may be used to calculate the translational displacement and the angular displacements in two orthogonal directions of the object, or the texture height and the inclinations of the object.

These and other objectives and advantages of this invention may be clearly understood from the detailed description by referring to the following drawings.

BRIEF DESCRIPTION OF THE DRAWINGS

In FIG. 2A, the surface of the object is positioned at the focus of the objective lens. In FIG. 2B, the object is moved by a distance of $-\Delta z$. In FIG. 2C, the object is moved by a distance of $+\Delta z$.

FIGS. 4A-4C show the variations of the PSD output signals by moving the object by the defocus distance $\Delta z$ (translational displacement) and the angular displacements $\theta_x$ around the X-axis of the object, as in the system for measurement of the height, angle and their variations of the surface of an object of this invention. In FIG. 4A, the object is positioned at the focus of the objective lens and is rotated by the angular $+\theta_x$ around the X-axis, whereby the light spot shifts from the center of the PSD assembly along the X'-axis. In FIG. 4B, the object has the defocus distance $-\Delta z$ and the angular displacement $+\theta_x$ around the X-axis. In FIG. 4C, the object has the defocus distance $+\Delta z$ and the angular displacement $+\theta_x$ around the X-axis.

FIGS. 5A-5C show the variations of the PSD output signals by moving the object by the defocus distance $\Delta z$ (translational displacement) and the angular displacements $\theta_y$ around the Y-axis of object, as in the system for measurement of the height, angle and their variations of the surface of an object of this invention. In FIG. 5A the object is positioned at the focus of the objective lens and is rotated by the angular displacement $-\theta_y$ around the Y-axis, whereby the light spot shifts from the center of the PSD assembly 3 along the Y'-axis. In FIG. 5B, the object surface has the defocus distance $-\Delta z$ and the angular displacement $-\theta_y$ around the Y-axis. In FIG. 5C, the object surface has the defocus distance $+\Delta z$ and the angular displacement $\theta_y$ around the Y-axis.

DETAILED DESCRIPTION OF THE INVENTION

Figure 1:
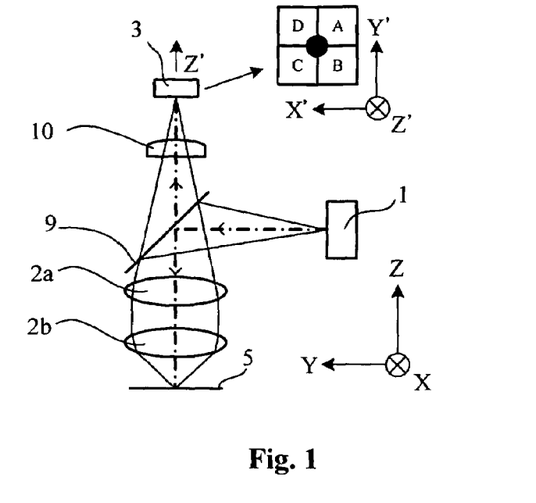
FIG. 1 illustrates the optical path mechanism of the system for measurement of the height, angle and their variations of the surface of an object of this invention.

FIG. 1 illustrates the optical path mechanism of the system for measurement of the height, angle and their variations of the surface of an object of this invention. The optical path mechanism of this invention comprises: a laser light source 1, objective lenses 2a and 2b, a four-quadrant position sensitive detector (PSD) assembly 3, a polarizing beam splitter 9 and a cylindrical lens 10. The surface of the object to be measured is labeled as 5. The light beam generated by the laser source 1 passes thought the beam splitter 9 and the objective lens 2a, becoming a parallel light beam, and projects to the surface of the object 5 at the focus of the objective lens 2b, forming a laser spot thereon. The light reflected from the object 5 passes through the objective lenses 2a, 2b and the beam splitter 9 and the cylindrical lens 10 and projects in the PSD assembly 3 at a proper position. The PSD assembly 3 consists of four quadrants of photo sensors A, B, C and D. The PSD assembly 3 is adjusted along the Z'-axis to a position where the PSDs are most sensitive to the astigmatic effects, whereby the focus errors $S_{FES}=(S_A+S_C)-(S_B+S_D)=0$ may be obtained when the surface of the object 5 is at the focus of the objective lens 2b. Similarly, the X'-axis angular $S_{X'}$ and the Y'-axis angular $S_{Y'}$ may also be obtained from $S_{X'}=(S_A+S_B)-(S_D+S_C)$ and $S_{Y'}=(S_A+S_D)-(S_C+S_B)$, wherein $S_A$, $S_B$, $S_C$ and $S_D$ are signals generated by the photo sensors A, B, C and D of the PSD assembly 3.

In the above and the following descriptions, axes in the Cartesian coordinate system of the optical path system at the object to be measured are represented by X, Y and Z and those at the PSD assembly are represented by X', Y' and Z'. The axis of the laser beam that impinges at the surface of the object is parallel to the Z axis. The plane of the PSD assembly 3 is perpendicular to the Z' axis. The configurational variation in the optical path system would change the relations between these two coordinate systems. The optical path mechanism as shown in FIG. 1 is only an example of the present invention. Other configurations of the optical path mechanism may also be used in the present invention, as long as they may generate the astigmatic effects.

In the present invention, the position of the PSD assembly 3 plays an important part in the measurement. When the object 5 is positioned at the focus of lens 2b and perpendicular to the Z axis, the PSD assembly 3 shall be positioned at where $S_{FES}=0$ and $S_{X'}=S_{Y'}=0$ are obtained. It is noted that when $S_{FES}$ approaches zero, the light spot projected on the PSD assembly 3 is circular in the ideal case, though not perfectly circular. This is because the imperfections in the lens may slightly distort the shape of the laser spot. The translational displacement of the object 5 along the Z axis and the angular displacement of the object 5 around the X axis or the Y axis may change the shape and the position of the light spot on the PSD assembly 3. Based on the $S_A$, $S_B$, $S_C$ and $S_D$ signals obtained from the PSD assembly 3, the translational displacements and the angular displacements of the surface of the object 5 may be obtained. In order to realize more accurate measurements, the surface of the object 5 preferably has a higher reflectivity, so that the reflected light may have the sufficient power to be sensed by the PSD assembly 3. In addition, the incident axis of the laser beam, the Z axis, is preferably perpendicular to the laser spot on the object 5. As long as the astigmatic effects function well, the number of photo sensors in the PSD assembly 3 is not necessarily limited to four. The configuration of the PSD assembly 3 is not limited to the quadrant design.

Figure 2:
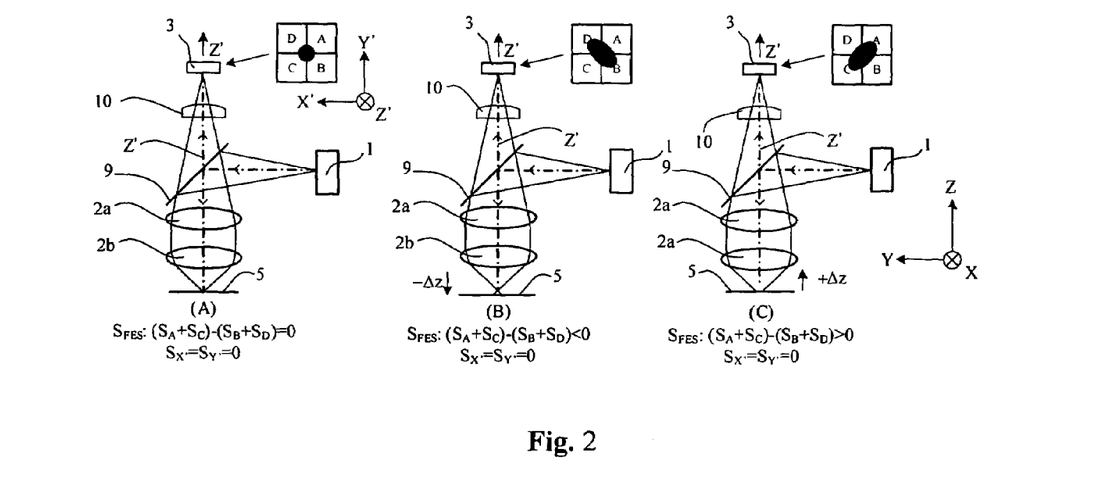
FIGS. 2A-2C show the relation between the output signals of the PSD (Position Sensitive Detector) assembly and the translational displacement of the object in the height direction, in the system for measurement of the height, angle and their variations of the surface of an object of this invention.
Figure 3:
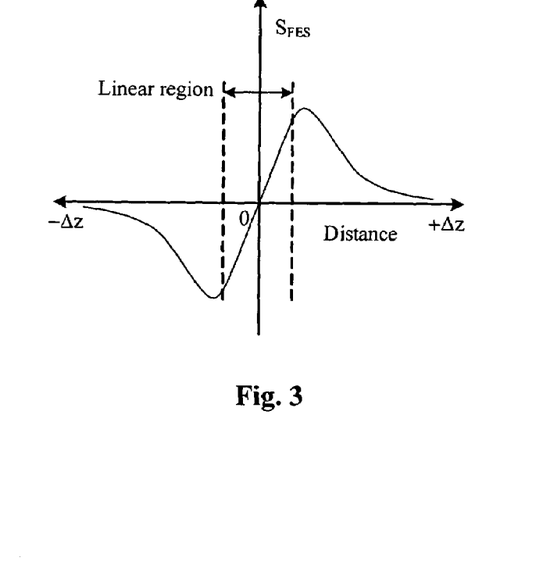
FIG. 3 shows the relation between the focus error signal, $S_{FES}$, and the defocus distance $\Delta z$ in the height direction of the object to be measured.

The relations between the outputs of the PSD assembly 3 and the translational and the angular displacements of the object 5 will be described below. FIGS. 2A-2C show the relation between the output signals of the PSD (Position Sensitive Detector) assembly and the translational displacement of the object in the height direction, in the system for measurement of the height, angle and their variations of the surface of an object of this invention. In this figure, it is supposed that the Z axis is perpendicular to the object 5, at the surface where the laser spot locates. In FIG. 2A, the surface of the object 5 is positioned at the focus of the objective lens 2b, whereby the light spot on the PSD assembly 3 has a circular shape. Under such a condition, the focus error signal $S_{FES}=(S_A+S_C)-(S_B+S_D)=0$. In FIG. 2B, the object 5 is moved by the distance of $-\Delta z$, along the Z-axis. Due to the astigmatic effects, the light spot on PSD assembly 3 becomes elongated in a particular direction. The PSD assembly 3 may be rotated around the Z'-axis, so that the long axis of the laser spot is in parallel with direction BD, whereby $S_{FES}=(S_A+S_C)-(S_B+S_D)<0$. In FIG. 2C, the object is moved by the distance of $+\Delta z$. Due to the astigmatic effects, the light spot on PSD assembly 3 also becomes elongated but with its long axis along direction AC, whereby $S_{FES}=(S_A+S_C)-(S_B+S_D)>0$. A plurality of experiments is conducted to obtain the relations between the $S_{FES}$ signals and the defocus distance of object to be measured. FIG. 3 shows the relation between the focus error signal, $S_{FES}$, and the defocus distance $\Delta z$ in the height direction of the object to be measured. As shown in FIG. 3, the relation forms a curve with a linear section within the region where the defocus distance $\Delta z$ is small. The scope of the linearity is determined by the factors of the configuration of the lens assembly, such as the focal length of the objective lens. Since the surface of object is perpendicular to the Z-axis, both angular signals $S_{X'}=(S_A+S_B)-(S_D+S_C)$ and $S_{Y'}=(S_A+S_D)-(S_C+S_B)$ approach to zero. Signals obtained from this optical path mechanism may be normalized by dividing them with $(S_A+S_C+S_B+S_D)$ to exclude the influences from the variations of the PSD signals caused by variations in the power of the light source or in the surface reflectivity of the objects to be measured.

Regarding the measurement of the angular displacement, when the object 5 is rotated by a small angle around an axis perpendicular to the Z axis, the light spot on the PSD assembly 3 would shift slightly from the center. Such variations may be used as the bases of angular measurement, as in the beam deflection method. In order to make the measurement easier, in the embodiment of this invention if the rotation of the object around an axis makes the light spot move along the X' direction of the PSD assembly, such axis is defined as the X axis. The axis perpendicular to the X axis and the Z axis is defined as the Y axis. Therefore, the rotation axis Y corresponds to the Y' direction in the PSD assembly 3. The angular displacements of the object 5 around one of the two orthogonal axes, X and Y, will lead to the displacement of the light spot on the PSD assembly 3 along one of the two orthogonal axes, X' and Y'. Thus, the angular displacements of the object can be calculated from the $S_{X'}$ and $S_{Y'}$ signals. Alternatively, one can define the orthogonal axes that are 45° rotated around the Z axis, relatively to the original Cartesian coordinate system of axes X and Y. Consequently, another set of signals $S_{AC}=S_A-S_C$ and $S_{BD}=S_B-S_D$ along the AC and BD directions, respectively, can be obtained to define the angular displacements of the object around one of the rotated orthogonal axes. In the present invention, the optical path mechanism is designed and adjusted to bring about the effective and significant angular signals $S_{X'}$ and $S_{Y'}$, with low cross talks.

Figure 4:
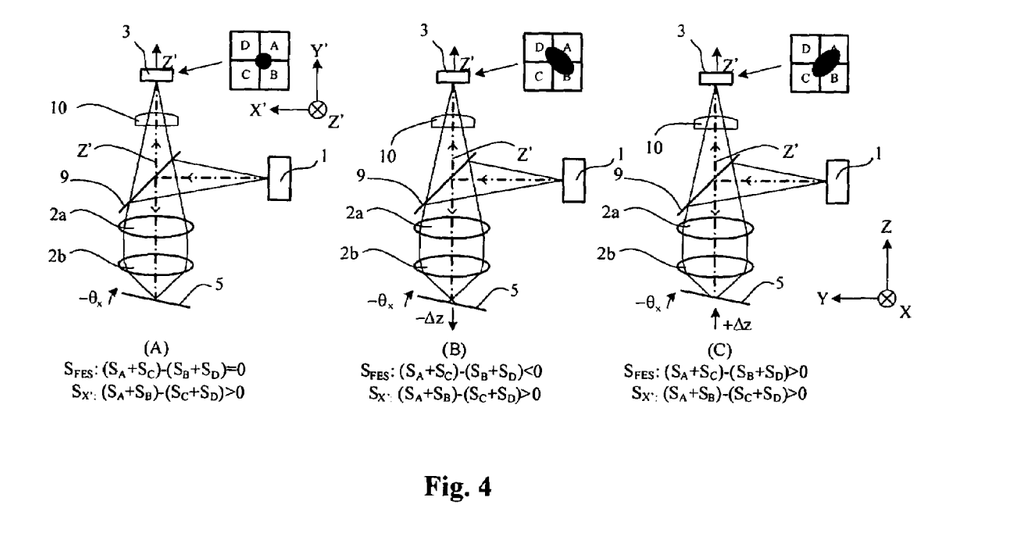

FIGS. 4A-4C show the variations of the PSD output signals by moving the object by the defocus distance $\Delta z$ (translational displacement) and the angular displacements $\theta_x$ around the X-axis of the object, as in the system for measurement of the height, angle and their variations of the surface of an object of this invention. In these figures, it is supposed that in the initial conditions, the axis of the laser beam projected from the objective lens 2b is perpendicular to the surface of the object 5, at the spot of the laser beam. When the object is positioned at the focus of the objective lens 2b and is rotated by the angular displacement $+\theta_x$ around the X-axis, the light spot on the PSD assembly 3 will move away from the center of the PSD's along the X' axis, as shown in FIG. 4A. Thereby, the angular displacement $+\theta_x$ around the X-axis may be obtained from $S_{X'}=(S_A+S_B)-(S_D+S_C)>0$. Since the object 5 is positioned at the focus of the objective lens 2b, $S_{FES}=(S_A+S_C)-(S_B+S_D)$ is still zero. In FIG. 4B, the object has the defocus distance of $-\Delta z$ and the angular displacement of $+\theta_x$ around X-axis. Here, the angular displacement $+\theta_x$ induces signal $S_{X'}=(S_A+S_B)-(S_D+S_C)>0$ and the defocus distance $-\Delta z$ produces signal $S_{FES}=(S_A+S_C)-(S_B+S_D)<0$. In FIG. 4C, the object 5 has the defocus distance of $+\Delta z$ and the angular displacement of $+\theta_x$ around the X axis. As a result, the angular signal, $S_{X'}=(S_A+S_B)-(S_D+S_C)>0$, and the defocus signal, $S_{FES}=(S_A+S_C)-(S_B+S_D)>0$, can also be obtained. With the angular signal and the defocus signal, the profile or the deformation of the surface of the object to be measured may be reconstructed.

Figure 5:
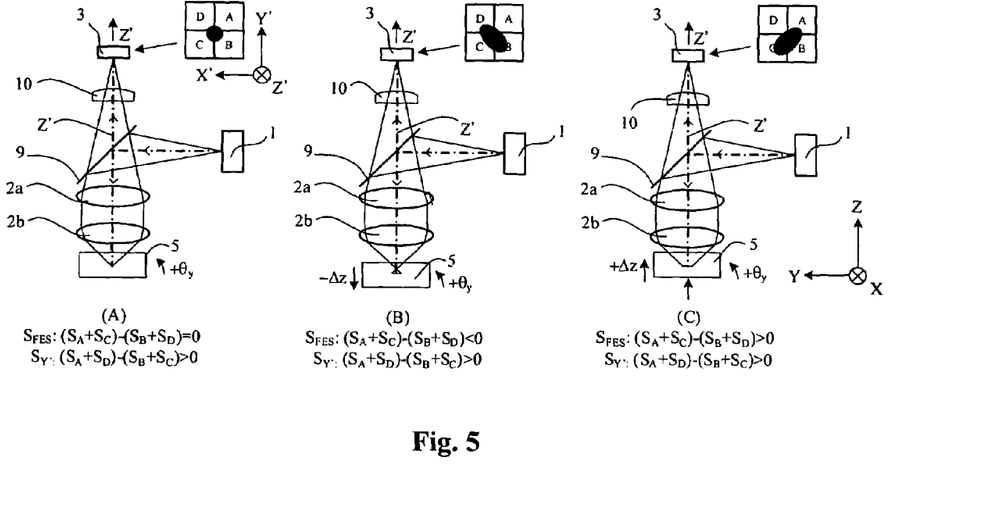

FIGS. 5A-5C show the variations of the PSD output signals by moving the object by the defocus distance $\Delta z$ (translational displacement) and the angular displacements $\theta_y$ around the Y-axis of object, as in the system for measurement of the height, angle and their variations of the surface of an object of this invention. Suppose the initial conditions are: The axis of the laser beam is perpendicular to the object 5 at the spot of the laser beam. When the laser spot is positioned at the focus of the object lens 2b and is rotated by the angular displacement $-\theta_y$ around the Y axis, the light spot on the PSD assembly 3 will move away along the Y' axis from the center of the PSD's, as shown in FIG. 5A. Thereby, the angular displacement $-\theta_y$ around the Y-axis may be obtained from the signal $S_{Y'}=(S_A+S_D)-(S_C+S_B)<0$. Since the object 5 is positioned at the focus of the objective lens 2b, $S_{FES}=(S_A+S_C)-(S_B+S_D)$ is still zero. In FIG. 5B, the object 5 has the defocus distance $-\Delta z$ and the angular displacement $-\theta_y$ around the Y axis. Here, the angular displacement $-\theta_y$ induces signal $S_{Y'}<0$ and the defocus distance $-\theta_y$ produces signal $S_{FES}<0$. In FIG. 5C, the object 5 has the defocus distance $+\Delta z$ and the angular displacement $-\theta_y$ around the Y axis. As a result, the angular signal $S_{Y'}<0$ and the defocus signal $S_{FES}>0$ can also be obtained. Therefore, based on the angular signal and the defocus signal, the profile or the deformation of the surface of the object to be measured may be reconstructed.

In the conventional art, Armstrong and Fitzgerald disclosed a technology wherein a modified CD pickup head is used in the precise measurement of angles. This technology is described in their publication: T. R. Armstrong and M. P. Fitzgerald: "An autocollimator based on the laser head of a compact disc player", Meas. Sci. Technol. 3,m 1992, 1072-1076. In this measurement system, the A-C and B-D signals generated by the PSD are used to measure the angular displacements of the object in two orthogonal directions, which are perpendicular to the axis of the incident laser beam. However, their invention did not have the optical path mechanism described in this invention; their invention is not able to measure the translational displacement of the objects.

Figure 6:
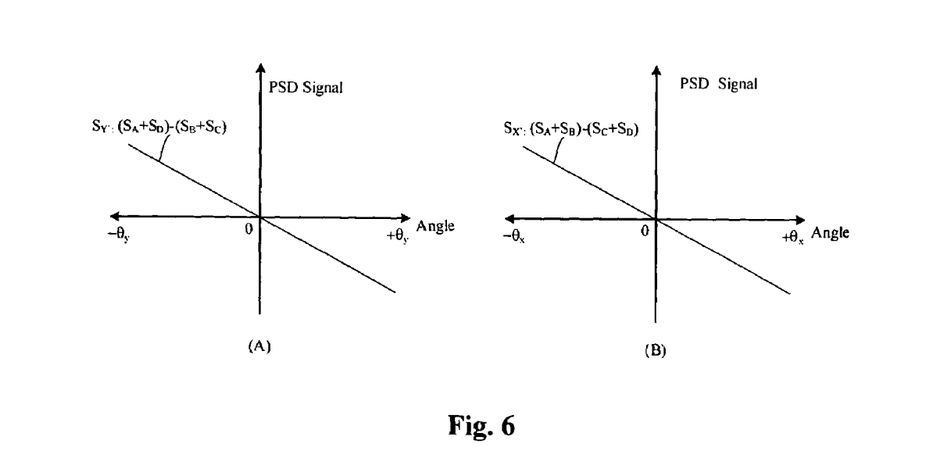
FIG. 6A shows the relations between the angular signal $S_{Y'}$ and the angular displacement $\theta_y$ around the Y-axis.
FIG. 6B shows the relations between the angular signal $S_{X'}$ and the angular displacement $\theta_x$ around the X-axis.

FIG. 6A shows the relation between the angular signal $S_{Y'}$ and the angular displacement $\theta_y$ around Y-axis. FIG. 6B shows the relation between the angular signal $S_{X'}$ and the angular displacement $\theta_x$ around X axis. Within the scope of linearity as described above, the angular signals $S_{X'}$ and $S_{Y'}$ can be used to calculate the angular displacements of the object around the X axis and the Y axis respectively. Despite of the defocus distance, the angular signals $S_{X'}$ and $S_{Y'}$ approach zero when the surface of the object 5 is perpendicular to the Z axis. Experiments show that the angular displacements $\theta_x$ and $\theta_y$ have little mutual interferences (cross talks) with each other.

Even though the height of the surface of the object 5 can be measured basically by the focus error signal, $S_{FES}$, the actually $S_{FES}$ is affected slightly by the angular displacement of the object. After several experiments are conducted under a variety of conditions, certain calibration curves representing the values of the signals and the displacements may be obtained. By applying these calibration curves, a signal processing module may be established to convert the focus error signals ands the angular signals into information representing the height, angle and their variations of the object to be measured. If the present invention is used in the atomic force microscope, the laser spot is projected on the rear surface of the cantilever. The translational displacement and the angular displacements (or bending deformation) of the cantilever may be detected by the signals $S_{FES}$, $S_{X'}$ and $S_{Y'}$. By scanning the surface of an object to be measured, the signals of the PSD assembly, together with the scanning position signals, may be used to reconstruct the 3-dimensional topography of the object.

The system for measurement of the height, angle and their variations of the surface of an object of this invention generates more information than the conventional technologies. According to this invention, the texture height, the deformation or displacement of the surface to be measured may be known from the translational signals and inclinations and the angular displacements of the surface may be revealed by the angular signals. The signal processing of this invention is not complicated and can be realized in electronic circuits or in any general-purpose microprocessor.

Figure 7:
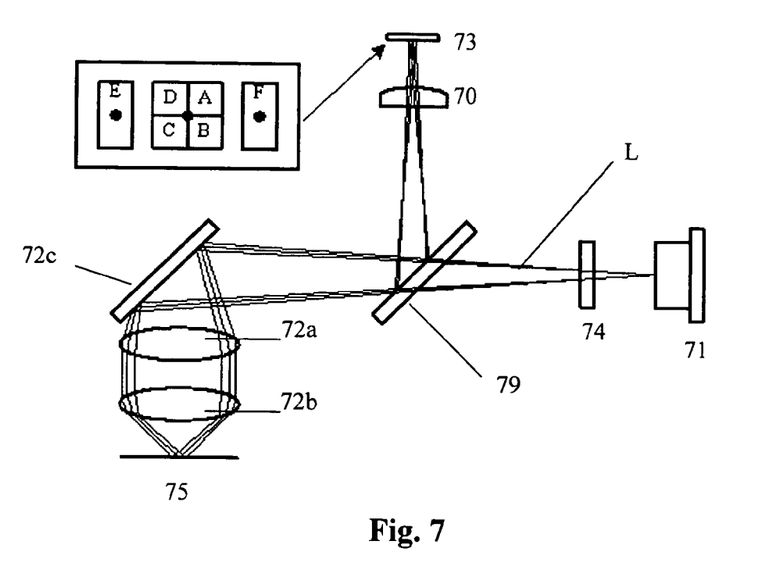
FIG. 7 shows the configuration of the optical path mechanism of one embodiment of the present invention, as used in an atomic force microscope to measure the translational and angular displacements of the cantilever.

FIG. 7 shows the optical path mechanism of one embodiment of the present invention, as used in an atomic force microscope to measure the translational and angular displacements of the cantilever. The laser beam L generated by laser diode 71 passes through diffraction grating 74 and is divided into three beams. They pass through polarization beam splitter 79, reflected by mirror 72c, pass through lenses 72a and 72b and are focused on the upper surface of cantilever 75, forming three spots thereon. The reflected laser beams go through the original path, reflected by polarization beam splitter 79, pass through a cylindrical lens 70 and project on photo diode IC 73. The shape of the light spot on the photodiode IC 73 may be known, whereby whether the upper surface of the cantilever is positioned at the focus of the objective lens 72b may thus be known. The commercially available DVD pickup head comprises a laser diode, necessary lenses, photodiodes and integrated circuit (IC) to measure the variation of the laser beam and to generate corresponding output signals. The pickup head is stable, reliable and of low cost. It may be used directly as the optical path mechanism in the present invention. Of course, it is also possible to use the pick-up heads of a CD drive, a Blu-ray drive, a high-density DVD drive etc. in this invention, as long as they use the astigmatism effects in the detection of the focusing conditions of the laser beam on the surface of the object to be measured.

A probe (or a tip, not shown) may be positioned at the free end of the cantilever 75. The laser beam is focused at the rear surface of the cantilever 75. The cantilever module is firmly affixed to the DVD pickup head. Use the photodiode IC 73 to detect the three laser beams as they are diffracted by the diffraction grating 74. The beam at center is detected by the photodiodes A, B, C and D. Information contained in the rest two laser beams may be used for other purposes. It is also possible to omit the diffraction grating 74, whereby only one beam will be generated. The interactions between the probe and the sample to be imaged (not shown) induces the bending deformations and the displacements of the cantilever 75 at the free end. The bending deformation and the displacement may be detected from the laser beam of the DVD pickup head.

The interactions between the AFM probe and the sample to be imaged will lead to the upward and downward bending of the cantilever. The bending deformations can be detected by a DVD pickup. The $S_{FES}$, $S_{X'}$ or $S_{Y'}$ signals derived from the information so obtained may be used as the feedback signals for the close loop control, so that the AFM topographic images of the sample may be obtained. These signals can also be used as inputs to the analog-to-digital converters to create the two-dimensional mapping of the surface properties.

For this measurement instrument, it is important to calibrate the $S_{FES}$, $S_{X'}$ and $S_{Y'}$ signals with respect to the actual translational displacement and the angular displacements of the object to be measured. A precision interferometer may measure the translational displacement and generate references to calibrate the $S_{FES}$ signals. Similarly, the angular signals $S_{X'}$ and $S_{Y'}$ may be calibrated by the references in the angular displacements. The $S_{FES}$, $S_{X'}$ and $S_{Y'}$ signals are correlated among them to a certain degree. In order to achieve the highly accurate measurements of the height, angle and their variations of object, it would be necessary to carry out detailed measurements of the correlation at all ranges.

Figure 8:
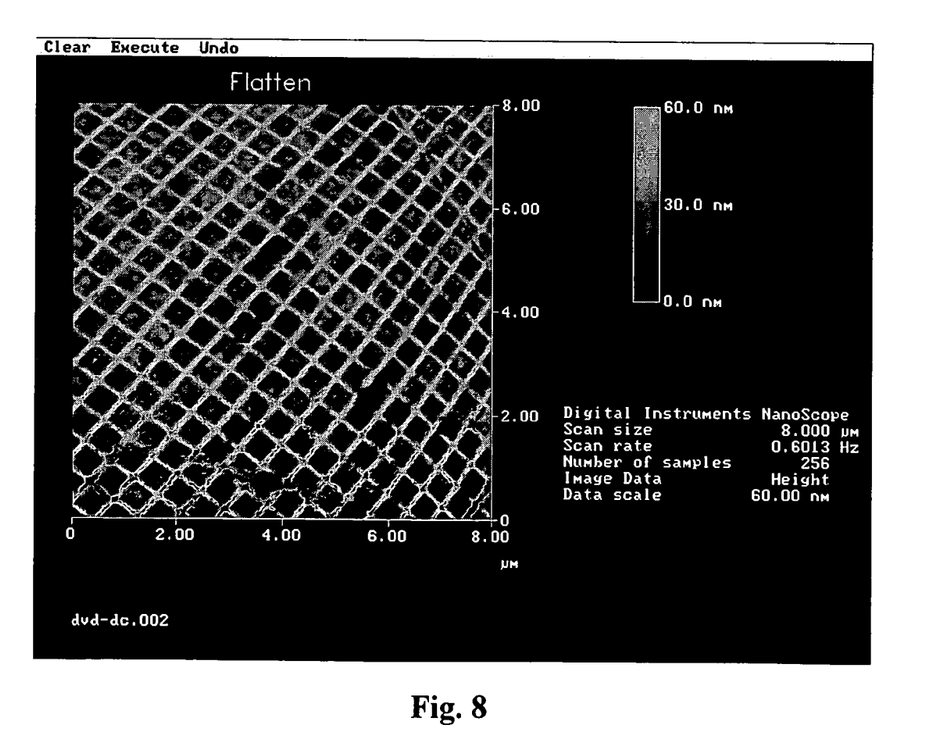
FIG. 8 shows the contact-mode AFM topographic image of a grating sample, as measured by the system for measurement of the height, angle and their variations of the surface of an object of this invention, wherein the Focus Error Signal $S_{FES}$ is used as the feedback signal.
Figure 9:
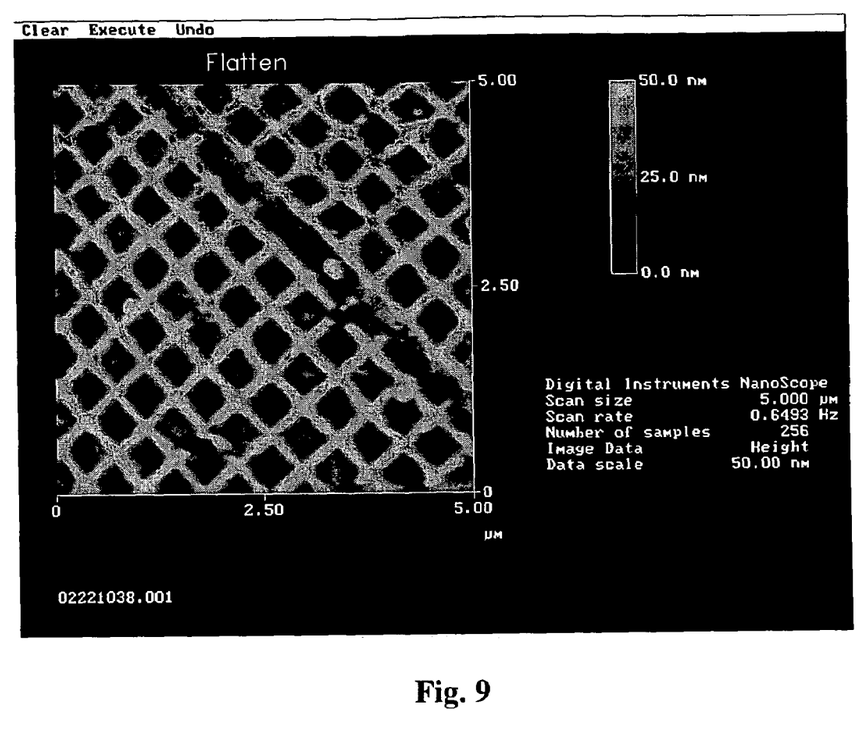
FIG. 9 shows an ac-mode (or tapping-mode) AFM topographic image of a grating sample, as taken by the system for measurement of the height, angle and their variations of the surface of an object of this invention, wherein the oscillating amplitude of the $S_{FES}$ signal is used as the feedback signal.

FIG. 8 shows the contact-mode AFM topographic image of a grating sample taken with this invented system. In this example, the obtained focus error signal $S_{FES}$ is used as the feedback signal in the close-loop control. This AFM imaging is conducted by using a DVD pickup as the optical detection module. The grating sample has the pitch of 463 nm and the texture height of 31 nm. FIG. 9 shows the ac-mode (or tapping-mode) AFM topographic image of a grating sample, wherein the oscillation amplitude of the alternating Focus Error Signal $S_{FES}$ is used as the feedback signal in the close-loop control. These reconstructed images have the same quality as those taken by the commercial AFM system under the beam deflection method.

In the system for measurement of the height, angle and their variations of the surface of an object of this invention, the commercially available DVD pickup may be used as the optical detection module to make the invented system compact, light-weight and easy to operate.

The system for measurement of the height, angle and their variations of the surface of an object of this invention can also be used to measure the samples directly without any cantilever or probe. The signals of the photodiode IC 73 may serve to generate the information of the surface topography of the object directly.

As the present invention has been shown and described with reference to preferred embodiments thereof, those skilled in the art will recognize that the above and other changes may be made therein without departing form the spirit and scope of the invention.

What is claimed is:

1. A system for measurement of the height, angle and their variations of the surface of an object, comprising a measurement module and an optical path mechanism, wherein said optical path mechanism comprises: a light source, a light beam splitter, an objective lens assembly, an astigmatic lens and a photo sensor assembly comprising a plurality of photo sensors distributed substantially in a plane;

wherein said optical path mechanism is so arranged that
a light beam generated by said light source passes through said light beam splitter and projects through said objective lens assembly to surface of an object adjacent to focus of said objective lens assembly, forming a light spot thereon and that said light beam reflects from said object surface, passes through said objective lens assembly, said light beam splitter and said astigmatic lens and projects to said photo sensor assembly, forming another light spot thereon; and wherein said measurement module calculates relative height, angle and their variations of said light spot on said object according to output signals of respective photo sensors of said photo sensor assembly.

2. The system for measurement of the height, angle and their variations of the surface of an object according to claim 1, wherein said light source is one selected from the group consisted of laser source, visual light source, infrared light source, and ultra violet source.

3. The system for measurement of the height, angle and their variations of the surface of an object according to claim 1, wherein said photo sensor assembly comprises four photo sensors distributed respectively in its four quadrants.

4. The system for measurement of the height, angle and their variations of the surface of an object according to claim 3, wherein said measurement module calculates focus error signal $S_{FES}$, X-axis angular signal $S_{X'}$ and Y-axis angular signal $S_{Y'}$ of said light spot according to the following formulas:

$$S_{FES}=(S_A+S_C)-(S_B+S_D)$$

$$S_{X'}=(S_A+S_B)-(S_D+S_C) \text{ and}$$

$$S_{Y'}=(S_A+S_D)-(S_C+S_B)$$

wherein $S_A$, $S_B$, $S_C$ and $S_D$ are signals output from said photo sensors in said four quadrants of said photo sensor assembly; $S_{FES}=0$ represents said light spot on surface of said object positioning at focus of said objective lens assembly; and $S_{X'}=S_{Y'}=0$ represents axis of incident light beam to said object being perpendicular to said surface of said object.

5. The system for measurement of the height, angle and their variations of the surface of an object according to claim 4, wherein said measurement module uses said $S_{FES}$ signal to calculate linear movement of said light spot on said object in its incident axis.

6. The system for measurement of the height, angle and their variations of the surface of an object according to claim 4, wherein said measurement module uses said $S_{X'}$ and $S_{Y'}$ signals to calculate angle of said light spot on said object in relation to incident axis of said light beam projected to said object.

7. The system for measurement of the height, angle and their variations of the surface of an object according to claim 5, wherein said measurement module normalizes said focus error signal $S_{FES}$ by the value of $(S_A+S_B+S_C+S_D)$.

8. The system for measurement of the height, angle and their variations of the surface of an object according to claim 6, wherein said measurement module normalizes said X-axis angular signal $S_{X'}$ and said Y-axis angular signal $S_{Y'}$ by the value of $(S_A+S_B+S_C+S_D)$.

9. The system for measurement of the height, angle and their variations of the surface of an object according to claim 1, wherein said astigmatic lens is one selected from the group consisted of a cylindrical lens and a declined planar light refraction layer.

10. The system for measurement of the height, angle and their variations of the surface of an object according to claim 1, further comprising a scan driving device to drive said optical path mechanism or said object so that said object moves relatively to said optical path mechanism.

11. The system for measurement of the height, angle and their variations of the surface of an object according to claim 4, wherein said object to be measured comprises a cantilever.

12. The system for measurement of the height, angle and their variations of the surface of an object according to claim 4, wherein said object to be measured comprises a cantilever provided with a probe.

13. The system for measurement of the height, angle and their variations of the surface of an object according to claim 4, further comprising a scan driving device provided with a piezoelectric device to drive said optical path mechanism or said object so that said object moves relatively to said optical path mechanism; wherein said object to be measured comprises a cantilever provided with a probe and wherein said measurement module uses said $S_{FES}$, $S_{X'}$, or $S_{Y'}$ signal as feedback in said piezoelectric device to drive said probe to move upwards or downwards along incident axis of said light beam projected to said object.

* * * * *